US012562851B2

(12) United States Patent
Li et al.

(10) Patent No.: US 12,562,851 B2
(45) Date of Patent: Feb. 24, 2026

(54) LAYER MAPPING FOR MULTI-TRP TRANSMISSIONS

(71) Applicants: QUALCOMM Incorporated, San Diego, CA (US); Qiaoyu Li, Beijing (CN); Yu Zhang, Beijing (CN); Chao Wei, Beijing (CN); Chenxi Hao, Beijing (CN); Liangming Wu, Beijing (CN); Hao Xu, Beijing (CN)

(72) Inventors: Qiaoyu Li, Beijing (CN); Yu Zhang, Beijing (CN); Chao Wei, Beijing (CN); Chenxi Hao, Beijing (CN); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 17/268,289

(22) PCT Filed: Aug. 13, 2019

(86) PCT No.: PCT/CN2019/100371
§ 371 (c)(1),
(2) Date: Feb. 12, 2021

(87) PCT Pub. No.: WO2020/034947
PCT Pub. Date: Feb. 20, 2020

(65) Prior Publication Data
US 2021/0306109 A1 Sep. 30, 2021

(30) Foreign Application Priority Data
Aug. 13, 2018 (WO) ................ PCT/CN2018/100167

(51) Int. Cl.
H04L 1/1829 (2023.01)
H04L 1/1812 (2023.01)
(Continued)

(52) U.S. Cl.
CPC .......... H04L 1/1861 (2013.01); H04L 1/1812 (2013.01); H04W 72/23 (2023.01); *H04L 1/0003* (2013.01)

(58) Field of Classification Search
CPC ... H04L 1/1861; H04L 1/1812; H04L 1/0003; H04W 72/23
See application file for complete search history.

(56) References Cited

U.S. PATENT DOCUMENTS 11,082,187 B2 8/2021 Sun et al.
11,212,036 B2 * 12/2021 Peng ..................... H04L 1/1825
(Continued)

FOREIGN PATENT DOCUMENTS

| CN | 104272690 A | 1/2015 |
| WO | 2018101799 A1 | 6/2018 |
| WO | 2019199477 | 10/2019 |

OTHER PUBLICATIONS

Supplementary European Search Report—EP19849701—Search Authority—Munich—Apr. 21, 2022.
(Continued)

*Primary Examiner* — Jael M Ulysse
(74) *Attorney, Agent, or Firm* — QUALCOMM Incorporated

(57) ABSTRACT

Certain aspects of the present disclosure provide techniques for layer mapping for multiple transmission reception point (TRP) transmission, for example, for code block group (CBG) based hybrid automatic repeat request (HARQ) acknowledgement feedback in new radio (NR). Aspects of the present disclosure provide a method for wireless communications by a user equipment (UE). The UE receives one or more transport blocks (TBs) from a plurality of TRPs. Each of the one or more TBs comprises a plurality of CBs. For one or more of the plurality of CBs, all bits of the CB
(Continued)

are received from a same TRP. The UE decodes the one or more TBs.

23 Claims, 10 Drawing Sheets

(51) Int. Cl.
*H04W 72/23* (2023.01)
*H04L 1/00* (2006.01)

(56) References Cited

U.S. PATENT DOCUMENTS

| | | | | |
|---|---|---|---|---|
| 11,411,668 | B2* | 8/2022 | Wang | H04L 1/1819 |
| 2010/0208680 | A1* | 8/2010 | Nam | H04L 5/0023 |
| | | | | 370/329 |
| 2010/0239035 | A1 | 9/2010 | Blankenship et al. | |
| 2011/0039568 | A1* | 2/2011 | Zhang | H04W 74/0833 |
| | | | | 455/452.1 |
| 2011/0194536 | A1* | 8/2011 | Kim | H04L 5/0094 |
| | | | | 370/335 |
| 2011/0237283 | A1* | 9/2011 | Shan | H04L 5/0091 |
| | | | | 455/509 |
| 2011/0261775 | A1* | 10/2011 | Kim | H04L 1/0057 |
| | | | | 370/329 |
| 2012/0002657 | A1* | 1/2012 | Seyama | H04L 1/0006 |
| | | | | 370/338 |
| 2013/0155832 | A1* | 6/2013 | Yang | H04L 1/0072 |
| | | | | 370/329 |
| 2013/0163406 | A1* | 6/2013 | Oizumi | H04W 72/21 |
| | | | | 370/242 |
| 2016/0191220 | A1* | 6/2016 | Noh | H04L 1/1893 |
| | | | | 370/329 |
| 2016/0233999 | A1* | 8/2016 | Chendamarai Kannan | |
| | | | | H04W 72/20 |
| 2016/0338129 | A1* | 11/2016 | Moulsley | H04L 1/18 |
| 2017/0171739 | A1* | 6/2017 | Suzuki | H04W 28/04 |
| 2017/0195082 | A1* | 7/2017 | Roh | H03M 13/1515 |
| 2017/0310431 | A1 | 10/2017 | Iyer et al. | |
| 2018/0006790 | A1* | 1/2018 | Park | H04L 1/1664 |
| 2018/0145797 | A1* | 5/2018 | Yeo | H04L 1/1812 |
| 2018/0159707 | A1* | 6/2018 | Onggosanusi | H04L 1/0025 |
| 2018/0167931 | A1* | 6/2018 | Papasakellariou | H04L 1/1812 |
| 2018/0167932 | A1* | 6/2018 | Papasakellariou | H04L 5/0091 |
| 2018/0191412 | A1* | 7/2018 | Suzuki | H04W 8/24 |
| 2018/0191413 | A1* | 7/2018 | Suzuki | H04W 72/23 |
| 2018/0205497 | A1 | 7/2018 | Wang et al. | |
| 2018/0220398 | A1 | 8/2018 | John Wilson et al. | |
| 2018/0270799 | A1* | 9/2018 | Noh | H04L 27/261 |
| 2018/0278368 | A1* | 9/2018 | Kim | H04L 1/0048 |
| 2018/0302191 | A1* | 10/2018 | Park | H04L 1/1614 |
| 2018/0323801 | A1* | 11/2018 | Hsu | H03M 13/116 |
| 2018/0323830 | A1* | 11/2018 | Park | H04L 25/02 |
| 2018/0367202 | A1* | 12/2018 | Yang | H04B 7/0478 |
| 2019/0069284 | A1* | 2/2019 | Wang | H04L 5/0094 |
| 2019/0124631 | A1* | 4/2019 | Ren | H04L 5/0048 |
| 2019/0132089 | A1* | 5/2019 | Hwang | H04L 1/1825 |
| 2019/0149197 | A1* | 5/2019 | Byun | H04B 7/0628 |
| | | | | 375/262 |
| 2019/0150181 | A1* | 5/2019 | Kim | H04L 1/1896 |
| | | | | 370/329 |
| 2019/0158230 | A1* | 5/2019 | Chen | H04L 1/1812 |
| 2019/0165888 | A1* | 5/2019 | Yeo | H04L 5/003 |
| 2019/0190630 | A1* | 6/2019 | Deng | H04W 24/10 |
| 2019/0223170 | A1* | 7/2019 | Deng | H04L 1/16 |
| 2019/0253204 | A1* | 8/2019 | Takeda | H04L 1/1657 |
| 2019/0260424 | A1* | 8/2019 | Byun | H04L 27/26 |
| 2019/0288809 | A1* | 9/2019 | Lyer | H04L 1/1893 |
| 2019/0297603 | A1* | 9/2019 | Guo | H04L 5/0053 |
| 2019/0313382 | A1* | 10/2019 | Sun | H04W 72/23 |
| 2019/0313386 | A1* | 10/2019 | Hwang | H04L 5/0094 |
| 2019/0334672 | A1* | 10/2019 | Byun | H04L 27/261 |
| 2019/0342062 | A1* | 11/2019 | Ren | H04L 5/10 |
| 2019/0372697 | A1* | 12/2019 | Wang | H04L 1/0003 |
| 2020/0008231 | A1* | 1/2020 | Vilaipornsawai | H04W 72/21 |
| 2020/0014491 | A1* | 1/2020 | Takeda | H04L 5/0055 |
| 2020/0015200 | A1* | 1/2020 | Vilaipornsawai | H04W 72/23 |
| 2020/0028640 | A1* | 1/2020 | Yeo | H04L 5/0007 |
| 2020/0036489 | A1* | 1/2020 | Wang | H04L 5/00 |
| 2020/0059327 | A1* | 2/2020 | Kini | H04L 43/0823 |
| 2020/0067651 | A1* | 2/2020 | Takeda | H04L 1/1896 |
| 2020/0067665 | A1* | 2/2020 | Dou | H04B 7/06 |
| 2020/0084005 | A1* | 3/2020 | Yoshimura | H04L 1/1671 |
| 2020/0092047 | A1* | 3/2020 | Yeo | H04W 72/23 |
| 2020/0100139 | A1* | 3/2020 | Kim | H04L 1/1812 |
| 2020/0154309 | A1* | 5/2020 | Takeda | H04L 1/1614 |
| 2020/0154467 | A1* | 5/2020 | Gong | H04L 5/0055 |
| 2020/0169351 | A1* | 5/2020 | Yoshimura | H04L 5/0055 |
| 2020/0169358 | A1* | 5/2020 | Ezaki | H04L 1/1864 |
| 2020/0178287 | A1* | 6/2020 | Kim | H04W 72/23 |
| 2020/0328848 | A1* | 10/2020 | He | H04L 1/1854 |
| 2020/0389345 | A1* | 12/2020 | Onggosanusi | H04L 67/62 |
| 2020/0389873 | A1* | 12/2020 | Liu | H04W 72/12 |
| 2021/0135791 | A1* | 5/2021 | Wang | H04L 1/0075 |
| 2021/0266944 | A1* | 8/2021 | Noh | H04W 72/1273 |

OTHER PUBLICATIONS

ZTE: "Multi-TRP Transmission and Interference Coordination", 3GPP TSG RAN WG1 NR Ad-Hoc#2, 3GPP Draft, R1-1710180 Multi-TRP Transmission and Interference Coordination, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), 7 Pages, XP051299404, Retrieved from the Internet: URL: http://www.3gpp.org/ftp/Meetings_ 3GPP_SYNC/RAN1/Docs/ [retrieved on Jun. 26, 2017], Section 2.

Ericsson: "On CBG Based Transmissions and Retransmissions," R1-1718646, 3GPP TSG RAN WG1 Meeting #90bis, Prague, CZ, Oct. 9-13, 2017, 5 pages.

Huawei et al., "Discussion on Multi-TRP Cooperation for URLLC", 3GPP TSG RAN WG1 Meeting #92, 3GPP Draft; R1-1802716, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 26, 2018-Mar. 2, 2018, Feb. 17, 2018 (Feb. 17, 2018), XP051398149, 5 Pages, Retrieved from the Internet: URL:http://www.3gpp.org/ ftp/tsg%5Fran/WG1%5FRL1/TSGR1%5F92/Docs/ [retrieved on Feb. 17, 2018], Section 2.

Huawei, et al., Discussion on the Multi-TRP/Panel Transmission in NR 3GPP TSG RAN WG1 Meeting #93, R1-1807130, May 25, 2018, 7 Pages.

Huawei, et al., Remaining Issues on CW Mapping 3GPP TSG RAN WG1 Meeting #92bis R1-1803632, Apr. 20, 2018, 6 pages.

International Search Report and Written Opinion—PCT/CN2018/ 100167—ISA/EPO—Feb. 27, 2019.

International Search Report and Written Opinion—PCT/CN2019/ 100371—ISA/EPO—Oct. 31, 2019.

ZTE Microelectronics: "Codeword to Layer Mapping and Interleaving," R1-1704390, 3GPP TSG RAN WG1 Meeting #88bis, Spokane, USA, Apr. 3-7, 2017, 10 pages.

ZTE Microelectronics: "Multi-TRP Transmission Considering Advanced Receiver," R1-1700119, 3GPP TSG RAN WG1 NR Ad-Hoc Meeting, Spokane, USA, Jan. 16-20, 2017, 7 pages.

Taiwan Search Report—TW108128726—TIPO—Sep. 20, 2022.

Taiwan Search Report—TW108128726—TIPO—Nov. 22, 2023.

Huawei, et al., "Remaining Issues on CW Mapping", 3GPP TSG RAN WG1 Meeting #92bis, R1-1803632, Sanya, China, Apr. 16-20, 2018, Apr. 6, 2018, 6 Pages.

ZTE: "Multi-TRP Transmission and Interference Coordination", 3GPP TSG RAN WG1 NR Ad-Hoc#2, R1-1710180, Qingdao, P.R. China Jun. 27-30, 2017, Jun. 17, 2017, 7 Pages.

ETSI: "5G, NR, Physical Channels and Modulation (3GPP TS 38.211 version 15.2.0 Release 15)", Technical Specification, ETSI TS 138 211 V15.2.0 (Jul. 2018), pp. 76-77, 98 Pages.

Nokia, et al., "Remaining Aspects of NR CA", 3GPP Draft, 3GPP TSG RAN WG1 Meeting #92, R1-1802540_CA, 3rd Generation

(56) References Cited

OTHER PUBLICATIONS

Partnership Project (3GPP). Mobile Competence Centre, 650, Route Des Lucioles, F-06921 Sophia-Antipolis Cedex, France, vol. RAN WG1, No. Athens, Greece, 20180226-20180302, 8 Pages, Feb. 16, 2018 (Feb. 16, 2018).

NTT DOCOMO: "Discussion on Codeword Mapping", 3GPP TSG RAN WG1 Meeting #88bis, R1-1705715, Spokane, USA Apr. 3-7, 2017, 3 Pages.

Samsung: "Finalizing Layer Mapping", 3GPP TSG RAN WG1 Meeting #90, R1-1713573, Prague, P.R. Czechia Aug. 21-25, 2017, 6 Pages.

* cited by examiner

300

305

RECEIVE ONE OR MORE TRANSPORT BLOCKS (TBs) FROM A PLURALITY OF TRANSMISSION RECEPTION POINTS (TRPS), WHEREIN: EACH OF THE ONE OR MORE TBS COMPRISES A PLURALITY OF CODE BLOCKS (CBS); AND FOR ONE OR MORE OF THE PLURALITY OF CBS, ALL OF THE BITS OF THE CB ARE RECEIVED FROM A SAME TRP

310

DECODE THE ONE OR MORE TBs

400

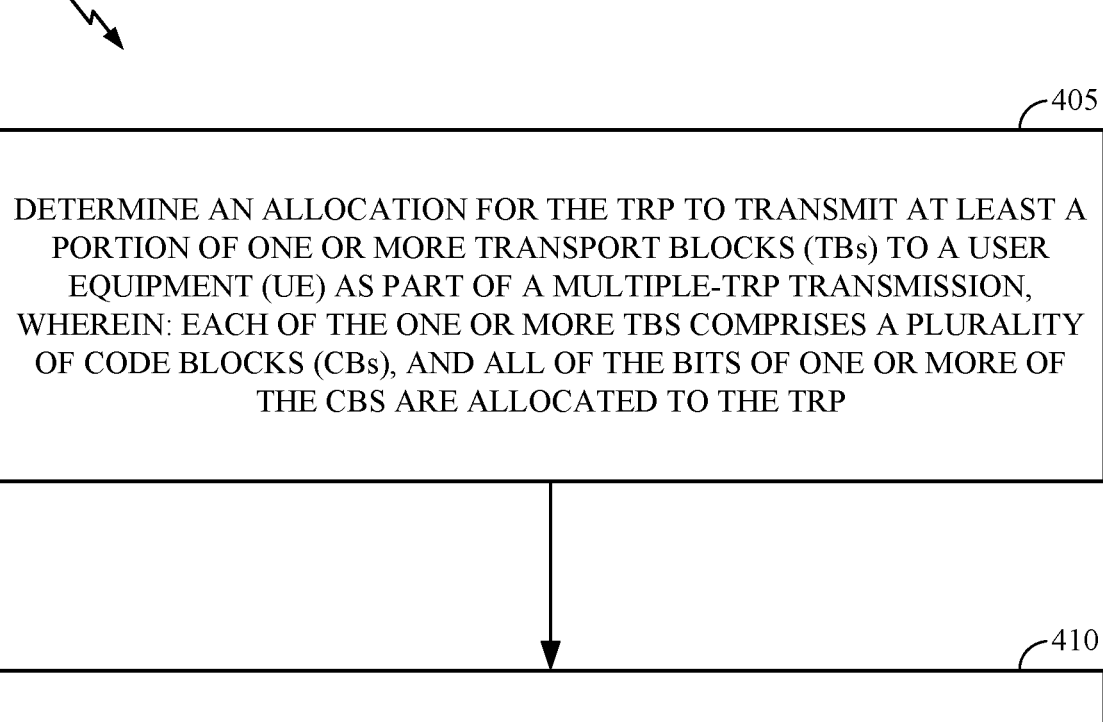

405

DETERMINE AN ALLOCATION FOR THE TRP TO TRANSMIT AT LEAST A PORTION OF ONE OR MORE TRANSPORT BLOCKS (TBs) TO A USER EQUIPMENT (UE) AS PART OF A MULTIPLE-TRP TRANSMISSION, WHEREIN: EACH OF THE ONE OR MORE TBS COMPRISES A PLURALITY OF CODE BLOCKS (CBs), AND ALL OF THE BITS OF ONE OR MORE OF THE CBS ARE ALLOCATED TO THE TRP

410

TRANSMIT THE ALLOCATED PORTION OF THE ONE OR MORE TBs TO THE UE

| # of layers of TRP-1 | # of layers of TRP-2 | CBs to TRP/layer mapping | |
|---|---|---|---|
| 1 | 1 | 1/2-CBs→layer-1 of 1st TRP | 1/2-CBs→layer-2 of 2nd TRP |
| 1 | 2 | 1/3-CBs→layer-1 of 1st TRP | 2/3-CBs→layer-1&2 of 2nd TRP |
| 2 | 2 | 1/2-CBs→layer-1&2 of 1st TRP | 1/2-CBs→layer-1&2 of 2nd TRP |
| 1 | 3 | 1/4-CBs→layer-1 of 1st TRP, | 3/4-CBs→layer-1&2&3 of 2nd TRP |

FIG. 5

| #Layers TRP1&2 | Ratio of CBs of 1st TB to TRP-1 & layer info | Ratio of CBs of 1st TB to TRP-2 & layer info | Ratio of CBs of 2nd TB to TRP-1 & layer info | Ratio of CBs of 2nd TB to TRP-2 & layer info |
|---|---|---|---|---|
| 1+4 | 1/2-CBs → layer-1 | 1/2-CBs → layer-1 | N/A | All-CBs → layer-2&3&4 |
| 1+5 | 1/3-CBs → layer-1 | 2/3-CBs → layer-1&2 | N/A | All-CBs → layer-3&4&5 |
| 1+6 | 1/3-CBs → layer-1 | 2/3-CBs → layer-1&2 | N/A | All-CBs → layer-3&4&5&6 |
| 1+7 | 1/4-CBs → layer-1 | 3/4-CBs → layer-1&2&3 | N/A | All-CBs → layer-4&5&6&7 |
| 2+3 | All-CBs → layer-1&2 | N/A | N/A | All-CBs → layer-1&2&3 |
| 2+4 | 2/3-CBs → layer-1&2 | 1/3-CBs → layer-1 | N/A | All-CBs → layer-2&3&4 |
| 2+5 | 2/3-CBs → layer-1&2 | 1/3-CBs → layer-1 | N/A | All-CBs → layer-2&3&4&5 |
| 2+6 | 1/2-CBs → layer-1&2 | 1/2-CBs → layer-1&2 | N/A | All-CBs → layer-2&3&4&5&6 |
| 3+3 | 1/3-CBs → layer-1 | 2/3-CBs → layer-1&2 | 2/3-CBs → layer-2&3 | 1/3-CBs → layer-3 |
| 3+4 | 1/3-CBs → layer-1 | 2/3-CBs → layer-1&2 | 1/2-CBs → layer-2&3 | 1/2-CBs → layer-3&4 |
| 3+5 | 1/2-CBs → layer-1&2 | 1/2-CBs → layer-1&2 | 1/4-CBs → layer-3 | 3/4-CBs → layer-3&4&5 |
| 4+4 | 1/2-CBs → layer-1&2 | 1/2-CBs → layer-1&2 | 1/2-CBs → layer-3&4 | 1/2-CBs → layer-3&4 |

| #Layers TRP1&2 | Ratio of CBs of 1st TB to TRP-1 & layer info | Ratio of CBs of 1st TB to TRP-2 & layer info | Ratio of CBs of 2nd TB to TRP-1 & layer info | Ratio of CBs of 2nd TB to TRP-2 & layer info |
|---|---|---|---|---|
| 1+4 | All-CBs → layer-1 | N/A | N/A | All-CBs → layer-1~4 |
| 1+5 | All-CBs → layer-1 | N/A | N/A | All-CBs → layer-1~5 |
| 1+6 | All-CBs → layer-1 | N/A | N/A | All-CBs → layer-1~6 |
| 1+7 | All-CBs → layer-1 | N/A | N/A | All-CBs → layer-1~7 |
| 2+3 | All-CBs → layer-1~2 | N/A | N/A | All-CBs → layer-1~3 |
| 2+4 | All-CBs → layer-1~2 | N/A | N/A | All-CBs → layer-1~4 |
| 2+5 | All-CBs → layer-1~2 | N/A | N/A | All-CBs → layer-1~5 |
| 2+6 | All-CBs → layer-1~2 | N/A | N/A | All-CBs → layer-1~6 |
| 3+3 | All-CBs → layer-1~3 | N/A | N/A | All-CBs → layer-1~3 |
| 3+4 | All-CBs → layer-1~3 | N/A | N/A | All-CBs → layer-1~4 |
| 3+5 | All-CBs → layer-1~3 | N/A | N/A | All-CBs → layer-1~5 |
| 4+4 | All-CBs → layer-1~4 | N/A | N/A | All-CBs → layer-1~4 |

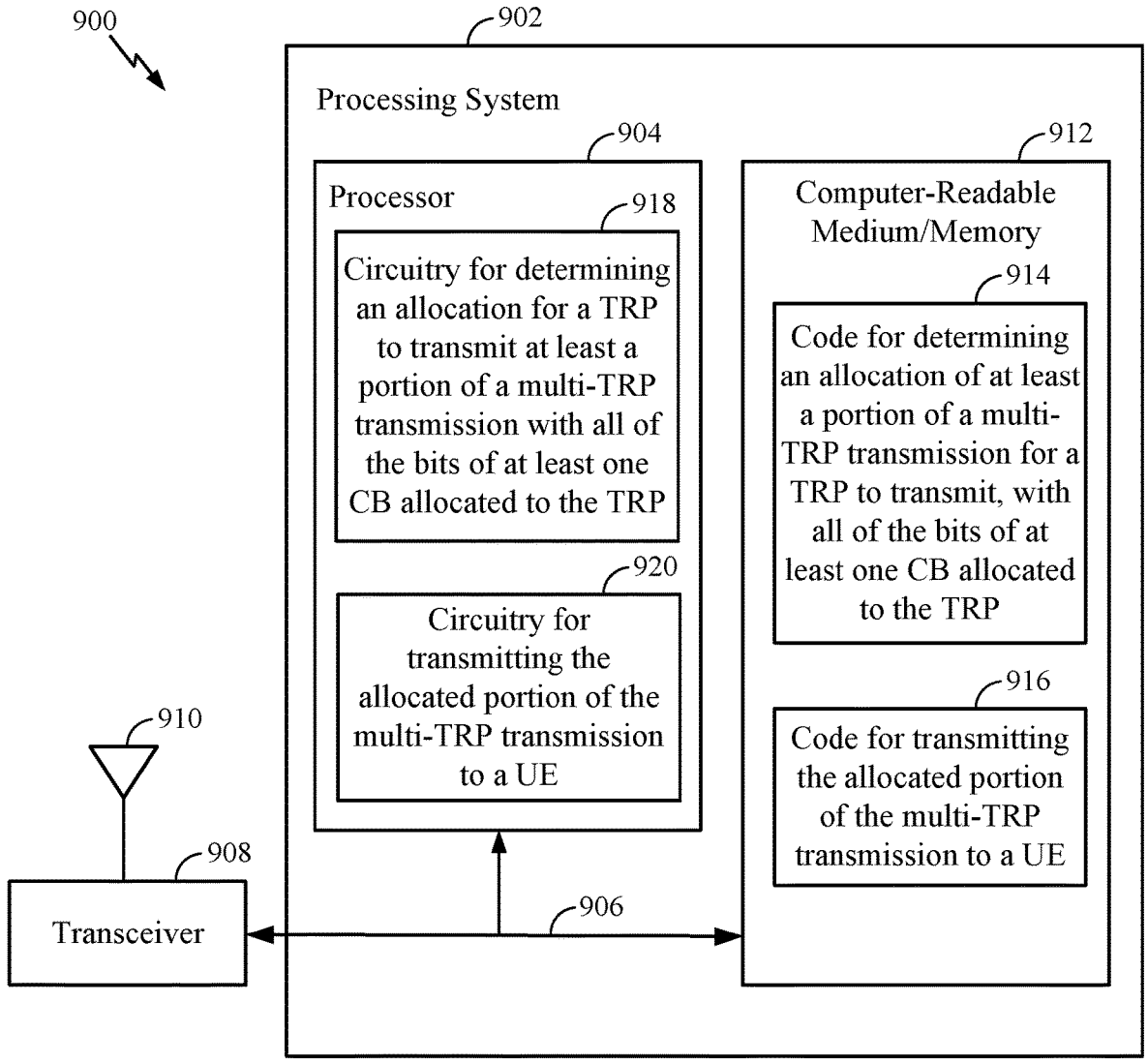

902

Processing System

904

Processor

918

Circuitry for determining an allocation for a TRP to transmit at least a portion of a multi-TRP transmission with all of the bits of at least one CB allocated to the TRP

920

Circuitry for transmitting the allocated portion of the multi-TRP transmission to a UE

912

Computer-Readable Medium/Memory

914

Code for determining an allocation of at least a portion of a multi-TRP transmission for a TRP to transmit, with all of the bits of at least one CB allocated to the TRP

916

Code for transmitting the allocated portion of the multi-TRP transmission to a UE

910

908

Transceiver

LAYER MAPPING FOR MULTI-TRP TRANSMISSIONS

CROSS-REFERENCE TO RELATED APPLICATION

This application is a national stage application under 35 U.S.C. 371 of PCT/CN2019/100371, filed Aug. 13, 2019, which claims benefit and priority to International Cooperation Treaty Application No. PCT/CN2018/100167, filed Aug. 13, 2018, which are both hereby assigned to the assignee hereof and hereby expressly incorporated by reference herein in their entireties as if fully set forth below for all applicable purposes.

BACKGROUND

Field of the Disclosure

Aspects of the present disclosure relate to wireless communications, and more particularly, to techniques for layer mapping for multiple transmission reception point (TRP) transmission, for example, for code block group (CBG) based hybrid automatic repeat request (HARQ) acknowledgement (ACK) feedback in new radio (NR).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving one or more transport blocks (TBs) from a plurality of transmission reception points (TRPs). Each of the one or more TBs comprises a plurality of code blocks (CBs). For one or more of the plurality of CBs, all bits of the CB are received from a same TRP. The method generally also includes decoding the one or more TBs.

Certain aspects provide a method for wireless communication by a TRP. The method generally includes determining an allocation for the TRP to transmit at least a portion of one or more TBs to a UE as part of a multiple-TRP transmission. Each of the one or more TBs comprises a plurality of CBs. All bits of one or more of the CBs are allocated to the TRP. The method generally also includes transmitting the allocated portion of the one or more TBs to the UE.

Certain aspects provide an apparatus for wireless communication, such as a UE. The apparatus generally includes means for receiving one or more TBs from a plurality of TRPs. Each of the one or more TBs comprises a plurality of CBs. For one or more of the plurality of CBs, all bits of the CB are received from a same TRP. The apparatus generally also includes means for decoding the one or more TBs.

Certain aspects provide an apparatus for wireless communication, such as a TRP. The apparatus generally includes means for determining an allocation for the apparatus to transmit at least a portion of one or more TBs to a UE as part of a multiple-TRP transmission. Each of the one or more TBs comprises a plurality of CBs. All bits of one or more of the CBs are allocated to the apparatus. The apparatus generally also includes means for transmitting the allocated portion of the one or more TBs to the UE.

Certain aspects provide an apparatus for wireless communication, such as a UE. The apparatus generally includes a receiver configured to receive one or more TBs from a plurality of TRPs. Each of the one or more TBs comprises a plurality of CBs. For one or more of the plurality of CBs, all bits of the CB are received from a same TRP. The apparatus generally also includes at least one processor coupled with a memory and configured to decode the one or more TBs.

Certain aspects provide an apparatus for wireless communication, such as a TRP. The apparatus generally includes at least one processor coupled with a memory and configured to determine an allocation for the apparatus to transmit at least a portion of one or more TBs to a UE as part of a multiple-TRP transmission. Each of the one or more TBs comprises a plurality of CBs. All bits of one or more of the CBs are allocated to the apparatus. The apparatus generally also includes a transmitter configured to transmit the allocated portion of the one or more TBs to the UE.

Certain aspects provide a computer readable medium having computer executable code stored thereon for wireless communication by a UE. The computer readable medium generally includes code for receiving one or more TBs from a plurality of TRPs. Each of the one or more TBs comprises a plurality of CBs. For one or more of the plurality of CBs, all bits of the CB are received from a same TRP. The computer readable medium generally also includes code for decoding the one or more TBs.

Certain aspects provide a computer readable medium having computer executable code stored thereon for wireless communication by a TRP. The computer readable medium generally includes code for determining an allocation for the TRP to transmit at least a portion of one or more TBs to a UE as part of a multiple-TRP transmission. Each of the one or more TBs comprises a plurality of CBs. All bits of one or more of the CBs are allocated to the TRP. The computer readable medium generally also includes code for transmitting the allocated portion of the one or more TBs to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 is a flow diagram illustrating example operations for wireless communication by a transmission reception point (TRP), in accordance with certain aspects of the present disclosure.

FIG. 5 is a table illustrating a layer mapping of code blocks (CBs) to layers at TRPs, in accordance with certain aspects of the present disclosure.

FIG. 6 is a table illustrating a layer mapping of CBs to layers at TRPs, in accordance with certain aspects of the present disclosure.

FIG. 7 is a table illustrating a layer mapping of CBs to layers at TRPs, in accordance with certain aspects of the present disclosure.

FIG. 9 illustrates a communications device that may include various components configured to perform operations for the techniques disclosed herein in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
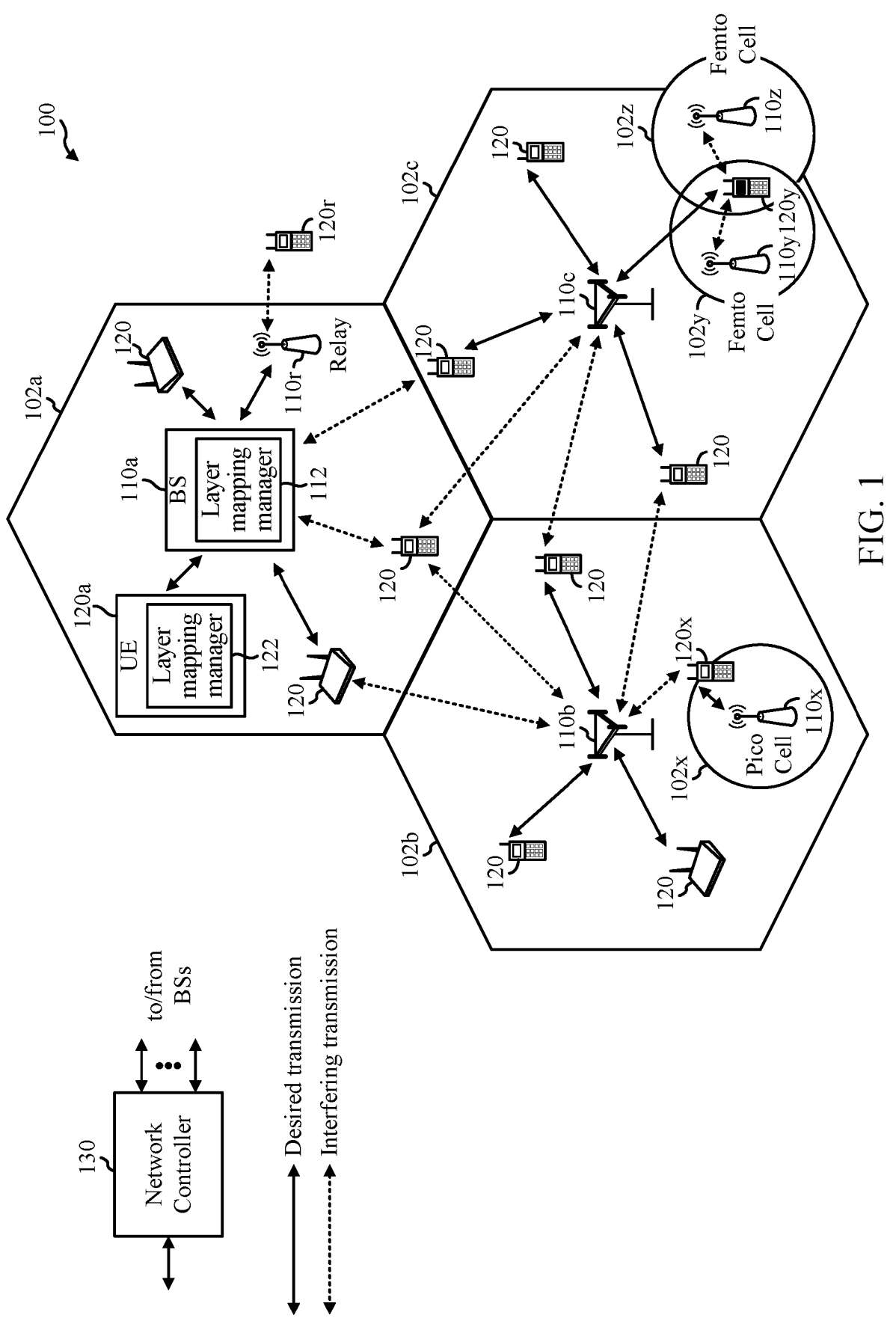
FIG. 1 is a block diagram conceptually illustrating an example telecommunications system, in accordance with certain aspects of the present disclosure.

Aspects of the present disclosure provide apparatus, methods, processing systems, and computer readable mediums for layer mapping for multiple transmission reception point (TRP) transmission, for example, for code block group (CBG) based hybrid automatic repeat request (HARQ) acknowledgement feedback in new radio (NR).

In some cases, a layer mapping configuration specifies that a signal transmitted by a layer for a multi-TRP transmission contains a bit-mixture of all CBs in a transport block (TB). In this case, if the signal from one TRP fails to be successfully decoded, this causes decoding failure of every CB (i.e., the whole TB). Therefore, techniques are desired for multi-TRP transmission layer mapping that may avoid decoding failure of the TB when the signal quality of one of the TRPs in the multi-TRP transmission is poor.

Accordingly, techniques and apparatus are provided herein for layer mapping for multi-TRP transmission. The layer mapping may ensure that the bits for a CB are transmitted by a single TRP. In some aspects, the layer mapping may mitigate the effect in the case that bits of a CB are transmitted by more than one TRP to improve the probability of successful decoding.

The following description provides examples for multi-TRP layer mapping, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with LTE or NR wireless technologies, aspects of the present disclosure can be applied in other generation-based communication systems, including later technologies.

NR access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

FIG. 1 illustrates an example wireless communication network 100 in which aspects of the present disclosure may be performed. For example, the wireless communication network 100 may be a NR network (e.g., 5G NR network). The wireless communication network 100 may include a plurality of TRPs, such one or more of the BSs 110, configured for multi-TRP transmission. The multi-TRP transmission may be according to a layer mapping configuration. As shown in FIG. 1, a UE 120a in the wireless communication network 100 includes a layer mapping manager 122. The layer mapping manager 122 may be configured to receive a multi-TRP transmission, such as one or more TBs from a plurality of TRPs which may include the BS 110a. Each of the one or more TBs comprises a plurality of CBs. According to the layer mapping configuration, for one or more of the plurality of CBs, all bits of the CB are received from a same TRP. Thus, the UE 120a decodes the one or more TBs and even if the UE fails to successfully decode one or more of the CBs from one of TRPs, the UE can still successfully decode the TB (e.g., if the UE successfully decodes the CBs from the other TRPs). As shown in FIG. 1, the BS 110a in the wireless communication network 100 includes a layer mapping manager 112. The layer mapping manager 112 may be configured to determine an allocation for a TRP to transmit at least a portion of the one or more TBs to the UE 120a as part of a multiple-TRP transmission. Each of the one or more TBs comprises a plurality of CBs, all bits of one or more of the CBs are allocated to the TRP. The BS 110a transmits the allocated portion of the one or more TBs to the UE 120a.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), and TRP may be interchangeable. In some examples, a cell may not be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g. a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, 5G NR RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
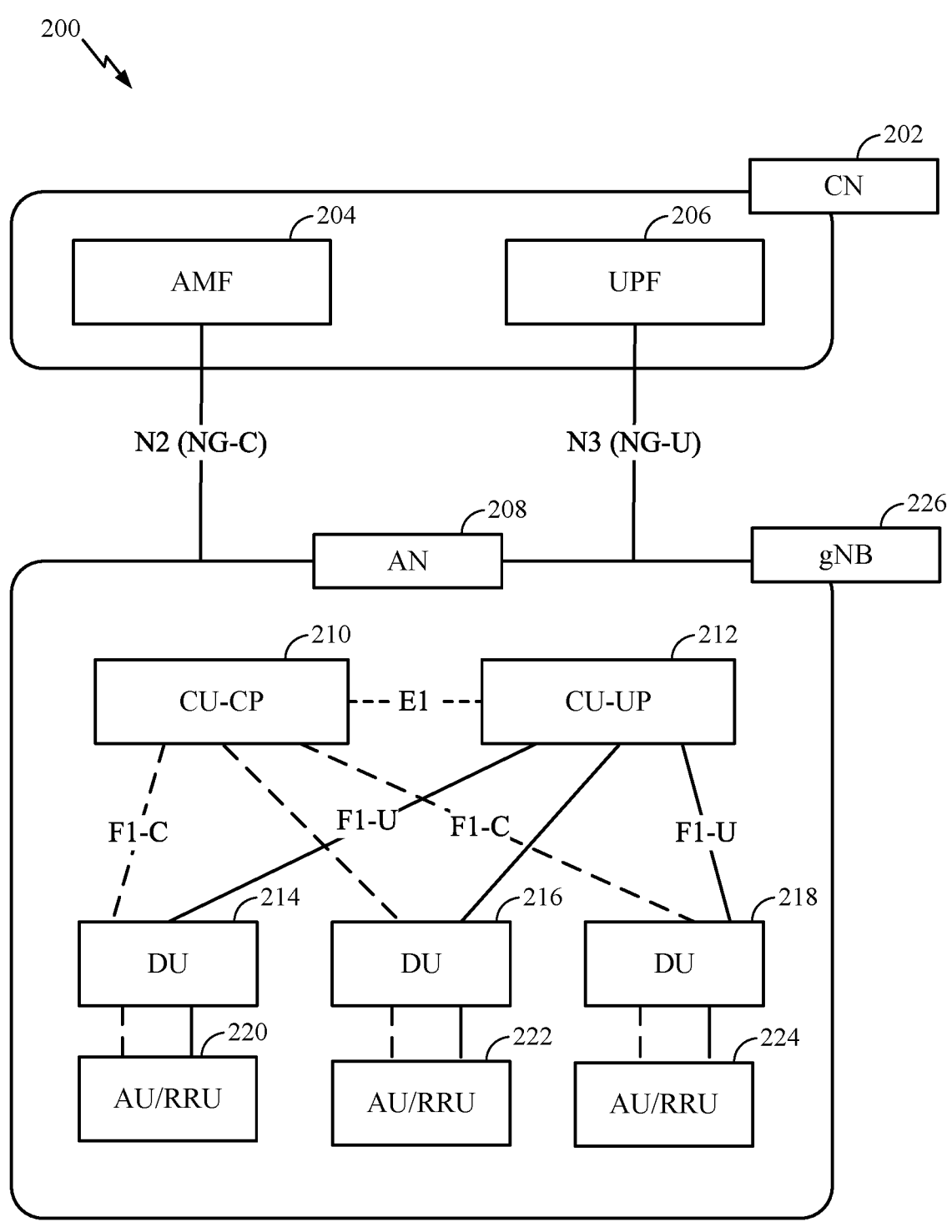
FIG. 2 is a block diagram illustrating an example logical architecture of a distributed radio access network (RAN), in accordance with certain aspects of the present disclosure.

FIG. 2 illustrates an example architecture of a distributed RAN 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218 may host one or more TRP(s), which may include an Edge Node (EN), an Edge Unit (EU), a Radio Head (RH), a Smart Radio Head (SRH), or the like. A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-TRP interface may not be used.

Logical functions may be dynamically distributed in the distributed RAN 200. The Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

In certain systems, UE(s) are configured to provide hybrid automatic repeat request (HARQ) feedback. The HARQ feedback may include acknowledgments (ACKs) and negative ACK (NACKs) for downlink transmissions. The HARQ feedback is provided by a UE to a transmission reception point (TRP). The HARQ feedback may be based on code block groups (CBGs). A CBG may consist of a number of code blocks (CBs) of a transport block (TB). The HARQ feedback may be based on a HARQ-ACK codebook. The number of CBs in a CBG may be configured by the network. The HARQ feedback may be provided at the CBG level. In this case, the TRP may only retransmit a CBG for which a NACK is received from the UE.

In certain systems, such as 5G NR systems, data (e.g., on a physical downlink shared channel (PDSCH)) is sent to the UE as a multiple TRP (multi-TRP) transmission. In some examples, a TB is transmitted via multiple TRPs as a non-coherent joint transmission (NC-JT), which can be considered as a multi-layer transmission. The multi-TRP transmission may be transmitted according to a layer mapping configuration. One example of a layer mapping configuration may be found in Section 7.3.1.3 of the 3GPP standards TS 38.211. In some cases, a layer mapping configuration may specify that a signal transmitted by a layer for a multi-TRP transmission contains a bit-mixture of all CBs in a TB. Thus, if the UE fails to decode the signal from one TRP (e.g., due to a poor link quality with the TRP), then this causes decoding failure of every CB (i.e., the whole TB), because the signal contained bits from all of the CBs-even if all of the layers of the other TRPs in the multi-TRP transmission have a much better link quality (e.g., a higher signal-to-noise ratio (SNR)).

Therefore, techniques are desired for multi-TRP transmission layer mapping that may avoid decoding failure of the TB when the signal quality of one or more of the TRPs in the multi-TRP transmission is poor.

Accordingly, techniques and apparatus are provided herein for layer mapping (e.g., layer mapping configuration/rules) for multi-TRP transmission. In some examples, the layer mapping ensures that the bits (i.e., all bits) for a CB are transmitted by a single TRP. In some aspects, the layer mapping may mitigate the effect in the case that bits of a CB are transmitted by more than one TRP. Thus, the layer mapping may improve the probability of successful decoding of a multi-TRP transmission. Aspects of the disclosure also provide for bit-scrambling by the TRPs. Aspects of the present disclosure provide techniques for the UE receiving a multi-TRP transmission to interpret (e.g., determine) the layer mapping.

Example Layer Mapping for Multi-TRP Transmission

According to certain aspects, a layer mapping (e.g., a layer mapping configuration/rule) is provided for multi-TRP transmission in which only a single TRP is responsible for (e.g., allocated) transmitting all bits of a CB, such that bits corresponding to the same CB are mapped to the layers corresponding to the same TRP. In some example, the layer mapping specifies that each TRP is responsible for part of the CBs in the TB. In some examples, the layer mapping specifies that each TRP is responsible for the entire TB. According to certain aspects, TRPs in a multi-TRP transmission may perform bit-level scrambling of the bits of the CBs corresponding to the same TB. According to certain aspects, the UE receiving the multi-TRP transmission determine the mapping of the CBs and/or CBGs to the TRPs and/or the layers at the TRPs that transmitted the CBs and/or CBGs. In some examples, the UE determines the layer mapping explicitly (e.g., via downlink control signaling) or implicitly (e.g., via the total number of layers and/or demodulation reference signal (DMRS) port group information).

In a general example, there may be N TRPs involved in a multi-TRP transmission, a number of TBs to be transmitted by the TRPs, and numbers of layers used by the N TRPs for transmitting the number of TBs. In some illustrative examples, there are 1 or 2 TRPs that transmit 1 or 2 TBs via 2-8 total layers among the TRPs. Each TB consists of a number of CBs, for example, a first TB consists of $C_1$ CBs and a second TB consists of $C_2$ CBs. According to a layer mapping (e.g., a layer mapping configuration/rule), the CBs (or bits of CBs) and/or CBGs of the TBs for a multi-TRP transmission may be allocated to the N TRPs and/or to layers at the N TRPs. In some examples, the allocation is based on network scheduling. In some examples, the allocation includes allocating a first part (e.g., a first subset) of the $C_1$ CBs for a first TB to a first TRP, a second part (e.g., a second subset) of the $C_1$ CBs for the first TB to a second TRP, and so on, until an N-th part of the $C_1$ CBs for the first TB is allocated to the N-th TRP. The remaining TBs may be allocated similarly. For example, the $C_2$ CBs for the second TB can be allocated in N parts to the N TRPs.

In general, at a TRP, the coded bits of the allocated CBs for a same TB are ordered in the increasing order of CB index. The ordered coded bits may then be scrambled, for example, based on a network configured scrambling identifier (ID). The scrambled bits are modulated to constellations based on the modulation order configured by the network. The TRP selects its layers for transmissions of the CBs for the TBs. For example, the TRP selects a first set of its layers for transmission of the allocated CBs for a first TB, a second set of its layers for transmission of the allocated CBs for a second TB, and so on. The layer selection may be based on a configuration by the network. The modulated symbols may be mapped to the selected layers at the TRPs in a layer-first order or a time-first order.

In one example, the number of TRPs is 2, the number of TBs is 1, and the number of layers may be up to 4. In this example, based on the network scheduling, part of the CBs for the TB are allocated to the first TRP for downlink transmission, and the remaining part of the CBs for the TB are allocated to the second TRP for downlink transmission. In some examples, the number of layers used by the first TRP for transmission of the first set of CBs is 1, 2, or 3 layers and the number of layers used by the second TRP transmission of the second set of CBs is 1, 2, or 3 layers, such that the total number of layers is 1-4 layers (e.g., 1+1, 1+2, 1+3, 2+2, 2+1, 3+1).

In another example, the number of TRPs is 2, the number of TBs is 2, and the total number of layers may be 5-8 layers. The CBs of the same TB may be allocated to layers at different TRPs, but the layers have the same modulation and coding scheme (MCS). In this example, based on the network scheduling, part of the CBs for the first and second TBs are allocated to the first TRP for downlink transmission, and the remaining parts of the CBs for the first and second TBs are allocated to the second TRP for downlink transmission. Alternatively, the CBs of the same TB may be allocated to layers at only one of the TRPs, and the TRPs may have different MCS. In this example, all of the CBs for the first TB are allocated to the first TRP and all of the CBs for the second TBs are allocated to the second TRP for downlink transmission. Thus, the layers at the first TRP for transmission of the first TB have the same first MCS and the layers at the second TRP for transmission of the second TB have another same MCS, which may be different than the first MCS.

According to certain aspects, the layer mapping for multi-TRP transmission attempts to allocate all bits of a CB to a same TRP. The allocation may also attempt to allocate CBs of a same CBG to a same TRP. In some cases, however, it may not be possible to allocate all bits of a CB to a same TRP or to allocate all of the CBs of a CBG to a same TRP (e.g., due to rate matching). According to certain aspects, if bits of a CB and/or CBs of a CBG are to be allocated to more than one TRP, the last CB and/or CBG may be selected to be allocated to the different TRPs. Bits of the last CB may be allocated to a later time-index of the layers. Thus, the UE may proceed the decoding of the CB/CBG in the front first. In this case, within a TRP, the bit-level scrambling may be carried out to the bits for the CBs that do not need separation into different TRPs and the CB/CBG that is separated may be bit-level scrambled by itself before modulation.

Figure 3:
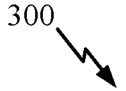
FIG. 3 is a flow diagram illustrating example operations for wireless communication by a UE, in accordance with certain aspects of the present disclosure.

FIG. 3 is a flow diagram illustrating example operations 300 for wireless communication, in accordance with certain aspects of the present disclosure. The operations 300 may be performed, for example, by a UE (e.g., such as the UE 120a in the wireless communication network 100 shown in FIG. 1). Operations 300 may be implemented as software components that are executed and run on one or more processors (e.g., controller/processor 1080 of FIG. 10). Further, the transmission and reception of signals by the UE in operations 300 may be enabled, for example, by one or more antennas (e.g., antennas 1052 of FIG. 10). In certain aspects, the transmission and/or reception of signals by the UE may be implemented via a bus interface of one or more processors (e.g., controller/processor 1080) obtaining and/or outputting signals.

The operations 300 may begin, at 305, by receiving one or more TBs (e.g., of a PDSCH transmission) from a plurality of TRPs (e.g., as a NC-JT). Each of the one or more TBs comprises a plurality of CBs. For one or more of the plurality of CBs, all bits of the CB are received from a same TRP. In some examples, the CBs from a TRP are received via a plurality of layers at the TRP. In some examples, the received bits from a TRP may be scrambled. The UE may perform descrambling of the scrambled bits.

In some examples, the UE receives a first set of one or more CBs from a first TRP via a first number of layers and a second set of one or more CBs from a second TRP via a second number of layers. The total number of the first and second number of layers may be at least two, three, or four layers, and the first and second number of layers have a same MCS.

In some examples, the UE receives a first set of one or more CBs of a first TB from a first TRP via a first number of layers, a second set of one or more CBs of a second TB from the first TRP via a second number of layers, a third set of one or more CBs of the first TB from a second TRP via a third number of layers, and a fourth set of one of more CBs of the second TB from the second TRP via a fourth number of layers. A total number of the first, second, third, and fourth number of layers may be at least five, six, seven, or eight layers. A total number of the first and third sets of CBs is the total number of CBs within the first TB and a total number of the second and fourth sets of CBs is the total number of CBs within the second TB. The first and third layers have a same first MCS and the second and fourth layers have another same MCS, which may be different than the first same MCS.

In some examples, the UE receives the plurality of CBs of a first TB from a first TRP via a first number of layers and the plurality of CBs of a second TB from a second TRP via a second number of layers. A total number of the first and second number of layers may be at least five, size, seven, or eight layers. The first and second TRPs may have different MCSs.

In some examples, CBs in a same CBG are received from a same TRP. In some examples, bits for at least one other CB of the plurality of CBs and/or CBs in at least one CBG are received from a different TRPs. The at least one CB or CBG may be a last CB or CBG of the TB for one or more of the plurality of CBs.

At 310, the UE decodes the one or more TBs.

In order to decode the TBs, the UE may determine information regarding the layer mapping. For example, the UE may determine the allocation (e.g., a first mapping) of CBs to TRPs and, at the allocation (e.g., a second mapping) of the CBs to the layers at the TRPs for the associated TBs. According to certain aspects, the determination of the information may be based on an implicit indication or an explicit indication to the UE from the network. The decoding, at 310, may include determining a first mapping of the CBs to one or more layers at the plurality of TRPs; determining, for each TRP, a second mapping of CBs transmitted on the one or more layers at the TRP to the one or more TBs associated with the CBs; and decoding the one or more TBs based on the determined first and second mappings.

According to certain aspects, the implicit indication may be based on the total number of layers, the respective number of layers used by each of the TRPs, and/or DMRS-port group information. For example, in the case of 2 TRPs, 1 TB, and up to 4 layers, having the same MCS, the UE may determine the layer mapping by the number of layers and DMRS-port-group information as shown in the Table 500 shown in FIG. 5. Different DMRS-port-groups may be associated with (e.g., correspond to) different TRPs and/or layers. In the case of 2 TRPs, 2 TBs, and 5-8 layers, having the same MCS for the same TB, the UE may determine the layer mapping by the number of layers and DMRS-port-group information as shown in the Table 600 shown in FIG. 6. In the case of 2 TRPs, 2 TBs, and 5-8 layers, having different MCS for TRPs that transmit different TBs, the UE may determine the layer mapping by the number of layers and DMRS-port-group information as shown in the Table 700 shown in FIG. 7.

In some examples, the UE may determine the layer mapping based on an explicit received indication via a downlink control signal. For example, the explicit indication may be received in downlink control information (DCI), a medium access control control element (MAC-CE), or a radio resource control (RRC) configuration. The number of bits for the explicit indication may be based on various factors, such as the number of TRPs, the number of layers, the number of TBs, etc.

According to certain aspects, the UE may provide HARQ feedback for the multi-TRP transmission. For example, the UE may provide HARQ feedback at the CB or CBG level.

FIG. 4 is a flow diagram illustrating example operations 400 for wireless communication, in accordance with certain aspects of the present disclosure. The operations 400 may be performed by a network entity, such as a TRP (e.g., the BS 110a in the wireless communication network 100, which may be a gNB). The operations 400 may be complementary to the operations 300 by the UE. Operations 400 may be implemented as software components that are executed and run on one or more processors (e.g., controller/processor

Figure 10:
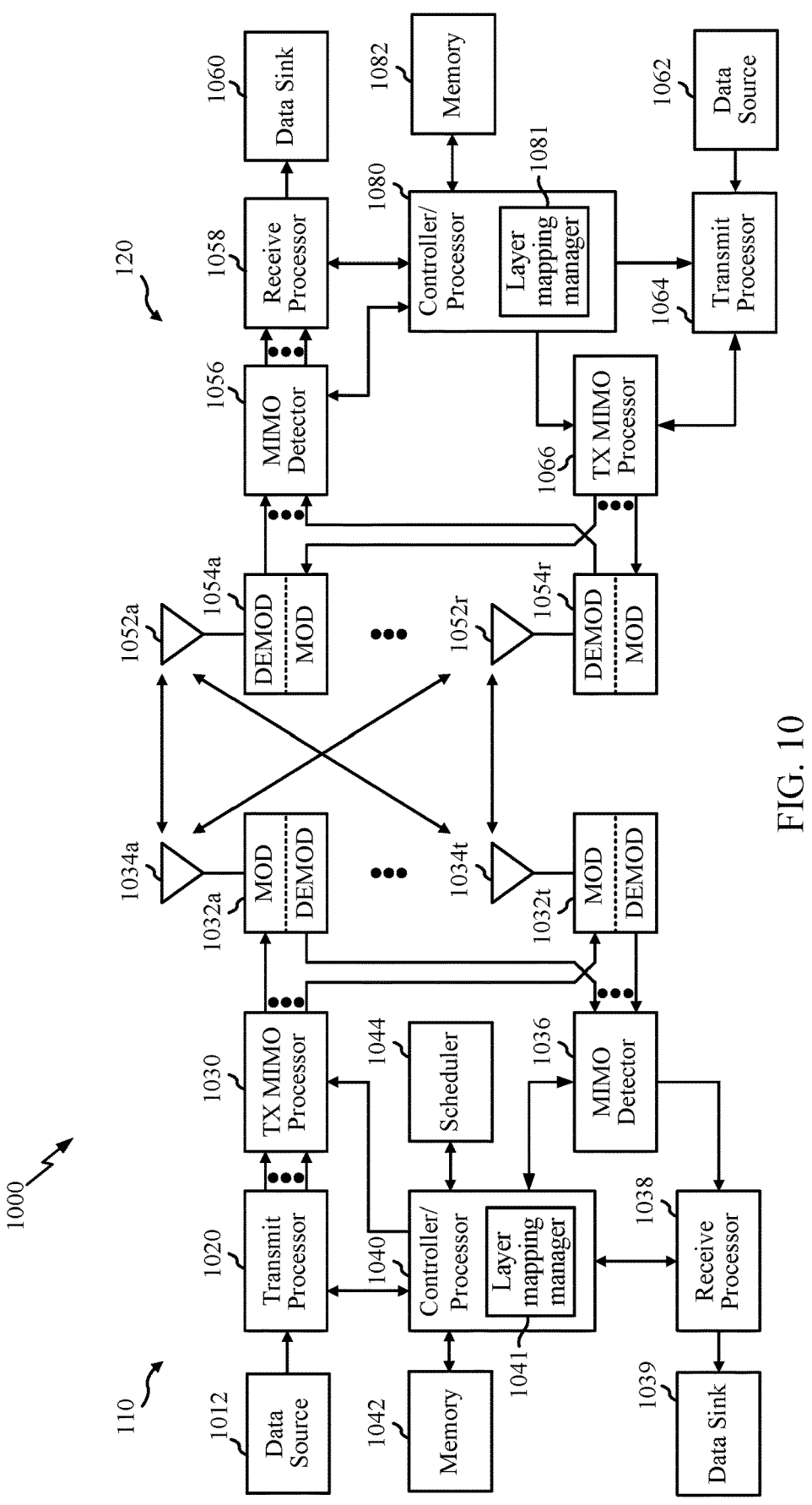
FIG. 10 is a block diagram conceptually illustrating a design of an example base station (BS) and user equipment (UE), in accordance with certain aspects of the present disclosure.

1040 of FIG. 10). Further, the transmission and reception of signals by the BS in operations 400 may be enabled, for example, by one or more antennas (e.g., antennas 1034 of FIG. 10). In certain aspects, the transmission and/or reception of signals by the BS may be implemented via a bus interface of one or more processors (e.g., controller/processor 1040) obtaining and/or outputting signals.

The operations 400 may begin, at 405, by determining an allocation for the TRP to transmit at least a portion of one or more TBs (e.g., for a PDSCH) to a UE as part of a multiple-TRP transmission (e.g., NC-JT). Each of the one or more TBs comprises a plurality of CBs. All bits of one or more of the CBs are allocated to the TRP.

At 410, the TRP transmits the allocated portion of the one or more TBs to the UE (e.g., via a plurality of layers at the TRP). According to certain aspects, the TRP may perform bit-level scrambling of CBs allocated for the TRP that are associated with a same TB. Before the scrambling, the TRP may order the bits in an increasing order of CB index associated with the bits (e.g., based on a scrambling ID configured by a network entity). The TRP may modulate the scrambled bits to modulated symbols (e.g., based on a modulation order configured by a network entity) and map the modulated symbols to layers at the TRP at least in order of layer or in order of time.

Although not shown, operations may be performed by a network entity, which may be central unit (CU), a master TRP, etc. The network entity may be responsible for implementing the layer mapping configuration. The network entity may configure one or more TRPs with the layer mapping. The network entity may allocate the bits, CBs, CBGs, and/or TBs to TRPs in the multi-TRP transmission. The network entity may or may not be one of the TRPs involved in the multi-TRP transmission. The network entity may provide the indication to the UE for the UE to determine the layer mapping.

Figure 8:
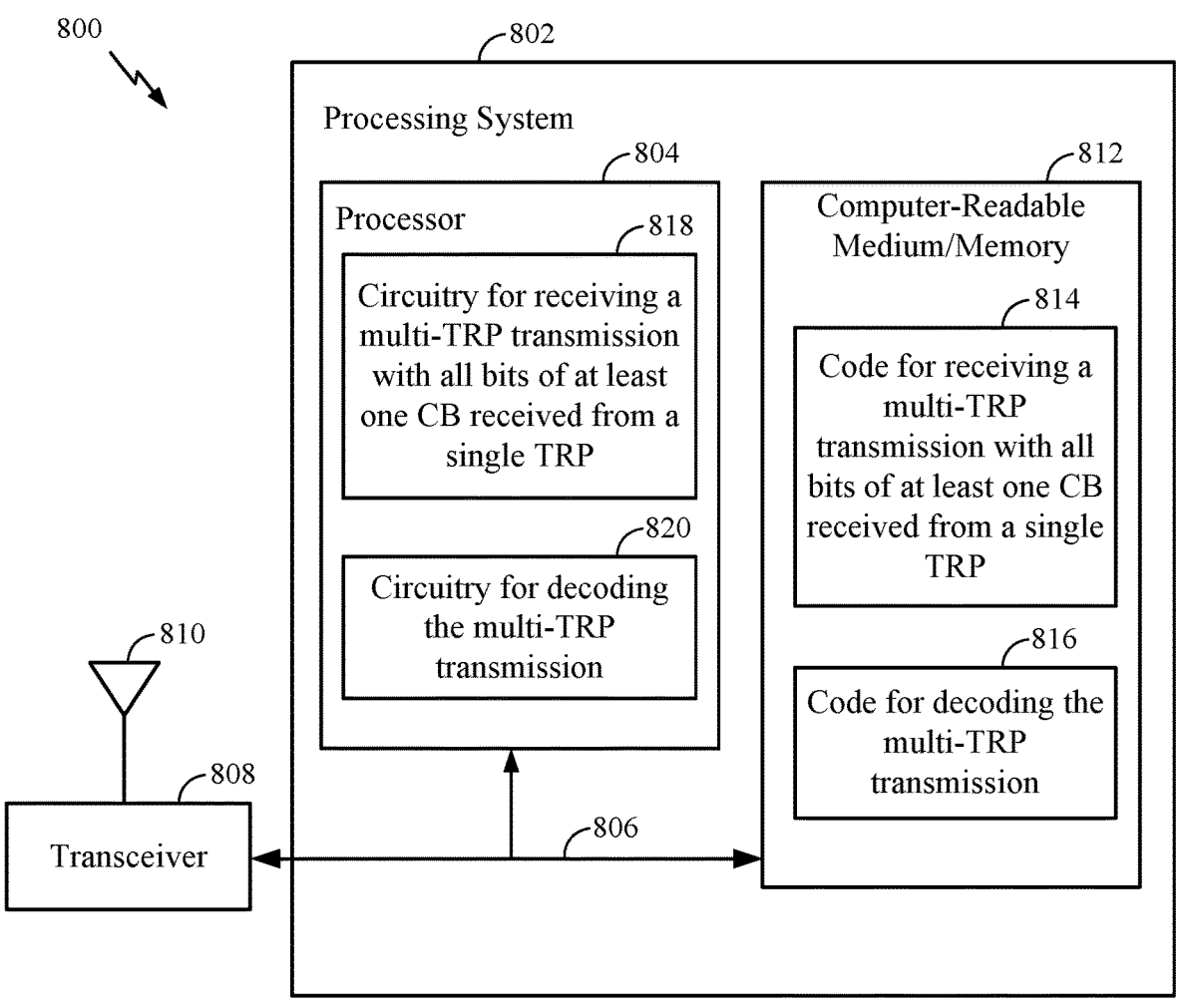
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 3. The communications device 800 includes a processing system 802 coupled to a transceiver 808. The transceiver 808 is configured to transmit and receive signals for the communications device 800 via an antenna 810, such as the various signals as described herein which may include a multi-TRP transmission. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer executable code) that when executed by the processor 804, cause the processor 804 to perform the operations illustrated in FIG. 3, or other operations for performing the various techniques discussed herein for layer mapping for multi-TRP transmission. In certain aspects, computer-readable medium/memory 812 stores code 814 for receiving TBs from a plurality of TRPs and code 816 for decoding the TBs, in accordance with aspects of the disclosure. In certain aspects, the processor 804 has circuitry configured to implement the code stored in the computer-readable medium/memory 812. The processor 804 includes circuitry 818 for decoding TBs; and circuitry 820 for receiving TBs from a plurality of TRPs, in accordance with aspects of the disclosure.

FIG. 9 illustrates a communications device 900 that may include various components (e.g., corresponding to means-plus-function components) configured to perform operations for the techniques disclosed herein, such as the operations illustrated in FIG. 4. The communications device 900 includes a processing system 902 coupled to a transceiver 908. The transceiver 908 is configured to transmit and receive signals for the communications device 900 via an antenna 910, such as the various signals as described herein which may include a part of a multi-TRP transmission. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/ memory 912 is configured to store instructions (e.g., computer executable code) that when executed by the processor 904, cause the processor 904 to perform the operations illustrated in FIG. 4, or other operations for performing the various techniques discussed herein for layer mapping for multi-TRP transmission. In certain aspects, computer-readable medium/memory 912 stores code 914 for determining an allocation to transmit at least a portion of one or more TBs to a UE as part of a multi-TRP transmission and code 916 for transmitting the allocated portion of the one or more TBs to the UE, in accordance with aspects of the disclosure. In certain aspects, the processor 904 has circuitry configured to implement the code stored in the computer-readable medium/memory 912. The processor 904 includes circuitry 918 for determining an allocation to transmit at least a portion of one or more TBs to a UE as part of a multi-TRP transmission and circuitry 920 for transmitting the allocated portion of the one or more TBs to the UE, in accordance with aspects of the disclosure.

FIG. 10 illustrates example components of BS 110*a* and UE 120*a* (as depicted in FIG. 1), which may be used to implement aspects of the present disclosure. For example, antennas 1052, processors 1066, 1058, 1064, and/or controller/processor 1080 of the UE 120*a* and/or antennas 1034, processors 1020, 1030, 1038, and/or controller/processor 1040 of the BS 110*a* may be used to perform the various techniques and methods described herein for layer mapping for multi-TRP transmission.

At the BS 110*a*, a transmit processor 1020 may receive data from a data source 412 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH), etc. The processor 1020 may process (e.g., encode and symbol map) the data and control information to obtain data symbols and control symbols, respectively. The processor 1020 may also generate reference symbols, e.g., for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032*a* through 1032*t*. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032*a* through 1032*t* may be transmitted via the antennas 1034*a* through 1034*t*, respectively.

At the UE 120*a*, the antennas 1052*a* through 1052*r* may receive the downlink signals from the BS 110*a* and may provide received signals to the demodulators (DEMODs) in transceivers 1054*a* through 1054*r*, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054*a* through 1054*r*, perform MIMO detection on the received symbols if applicable, and provide detected symbols. A receive processor 1058 may process (e.g., demodulate, deinterleave, and decode) the detected symbols, provide decoded data for the UE 120 to a data sink 1060, and provide decoded control information to a controller/processor 1080.

On the uplink, at UE 120*a*, a transmit processor 1064 may receive and process data (e.g., for the physical uplink shared channel (PUSCH)) from a data source 1062 and control information (e.g., for the physical uplink control channel (PUCCH) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054*a* through 1054*r* (e.g., for SC-FDM, etc.), and transmitted to the BS 110*a*. At the BS 110*a*, the uplink signals from the UE 120*a* may be received by the antennas 1034, processed by the modulators 1032, detected by a MIMO detector 1036 if applicable, and further processed by a receive processor 1038 to obtain decoded data and control information sent by the UE 120*a*. The receive processor 1038 may provide the decoded data to a data sink 1039 and the decoded control information to the controller/processor 1040.

The controllers/processors 1040 and 1080 may direct the operation at the BS 110*a* and the UE 120*a*, respectively. The processor 1040 and/or other processors and modules at the BS 110*a* may perform or direct the execution of processes for the techniques described herein. The memories 1042 and 1082 may store data and program codes for BS 110*a* and UE 120*a*, respectively. A scheduler 1044 may schedule UEs for data transmission on the downlink and/or uplink.

As shown in FIG. 10, the controller/processor 1080 of the UE 120*a* includes a layer mapping manager 1081. The layer mapping manager 1081 may be configured to receive a multi-TRP transmission, such as one or more TBs from a plurality of TRPs which may be the BS 110*a*. Each of the one or more TBs comprises a plurality of CBs. According to the layer mapping configuration, for one or more of the plurality of CBs, all bits of the CB are received from a same TRP. Thus, the UE 120*a* decodes the one or more TBs and even if the UE fails to successfully decode one or more of the CBs from one of TRPs, the UE can still successfully decode the TB (e.g., if the UE successfully decodes the CBs from the other TRPs). As shown in FIG. 10, the controller/ processor 1040 of the BS 110*a* includes a layer mapping manager 1041. The layer mapping manager 1041 may be configured to determine an allocation for a TRP to transmit at least a portion of the one or more TBs to the UE 120*a* as part of a multiple-TRP transmission. Each of the one or more TBs comprises a plurality of CBs, all bits of one or more of the CBs are allocated to the TRP. The BS 110a transmits the allocated portion of the one or more TBs to the UE 120a.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital sub-scriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 3 and FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communications by a user equipment (UE), the method comprising:
   receiving an indication of a number of layers at a plurality of transmission reception points (TRPs) and demodulation reference signal (DMRS) port information for the plurality of TRPs;
   determining, based on the indicated number of layers and DMRS port information for the plurality of TRPs, a mapping of a plurality of code blocks (CBs) of one or more transport blocks (TBs) to the numbers of layers at the plurality of TRPs, wherein for one or more CBs of the plurality of CBs, all bits of the CB are mapped to a same TRP of the plurality of TRPs; and
   decoding the one or more TBs based on the determined mapping.

2. The method of claim 1, wherein:
   the one or more TBs correspond to a physical downlink shared channel (PDSCH) transmission; and
   the one or more TBs are received from the plurality of TRPs at least as a non-coherent joint transmission (NC-JT).

3. The method of claim 1, wherein all of the bits of the one or more CBs of the plurality of CBs mapped to the same TRP and that are associated with a same TB are scrambled.

4. The method of claim 1, wherein:
   the plurality of TRPs comprises N TRPs;
   the plurality of CBs comprises, for each of the one or more TBs, N sets of one or more CBs; and
   at least one set of the N sets of one or more CBs, for each of the one or more TBs, is mapped to each of the N TRPs.

5. The method of claim 4, wherein:
   the N TRPs is two TRPs comprising a first TRP and a second TRP;
   the one or more TBs is one TB;
   a first set of the N sets of one or more CBs is mapped to the first TRP via a first number of layers;
   a second set of the N sets of one or more CBs is mapped to the second TRP via a second number of layers; and
   a total number of the first and second number of layers is two, three, or four layers.

6. The method of claim 4, wherein:
   the N TRPs is two TRPs comprising a first TRP and a second TRP;
   the one or more TBs is two TBs comprising a first TB and a second TB;
   a first set of the N sets of one or more CBs of the first TB is mapped to the first TRP via a first number of layers;
   a second set of the N sets of one or more CBs of the second TB is mapped to the first TRP via a second number of layers;
   a third set of the N sets of one or more CBs of the first TB is mapped to the second TRP via a third number of layers;
   a fourth set of the N sets of one or more CBs of the second TB is mapped to the second TRP via a fourth number of layers;
   a total number of the first, second, third, and fourth number of layers is five, six, seven, or eight layers;
   a total number of the first and third set of CBs is equal to a total number of CBs within the first TB; and a total number of the second and fourth set of CBs is equal to the total number of CBs within the second TB.

7. The method of claim 1, wherein:
the plurality of TRPs is two TRPs comprising a first TRP and a second TRP;
the one or more TBs is two TBs comprising a first TB and a second TB;
the CBs of the first TB are mapped to the first TRP via a first number of layers;
the CBs of the second TB are mapped to the second TRP via a second number of layers; and
a total number of the first and second number of layers is five, six, seven, or eight layers.

8. The method of claim 1, wherein:
the CBs of a same TB, of the one or more TBs, are mapped to at least one of: layers or TRPs having a same modulation and coding scheme (MCS); and
CBs of different TBs, of the one or more TBs, are mapped to at least one of: layers or TRPs having a different MCS.

9. The method of claim 1, wherein CBs in a same CB group (CBG) are mapped to layers of a same TRP.

10. The method of claim 1, wherein:
at least one of: different bits of at least one CB of the plurality of CBs are mapped to layers of different TRPs or different CBs in at least one CB group (CBG) are mapped to layers of different TRPs; and
the at least one other CB comprises a last CB of a TB or the at least one CBG comprises a last CBG of the TB.

11. A method for wireless communications by a network entity, the method comprising:
determining a number of layers at a plurality of transmission reception points (TRPs) and demodulation reference signal (DMRS) port information for the plurality of TRPs;
determining a mapping of a plurality of code blocks (CBs) of one or more transport blocks (TBs) to the numbers of layers at the plurality of TRPs, wherein for one or more CBs of the plurality of CBs, all bits of the CB are mapped to a same TRP of the plurality of TRPs; and
allocating, based on the determined mapping, the CBs of the one or more to TBs to layers of plurality of TRPs, for transmission to a user equipment (UE) as part of a multiple-TRP transmission of the one or more TBs UE.

12. The method of claim 11, wherein:
the one or more TBs correspond to a physical downlink shared channel (PDSCH) transmission; and
the multiple-TRP transmission comprises a non-coherent joint transmission (NC-JT).

13. The method of claim 11, further comprising:
scrambling the all of the bits of the one or more CBs of the CBs that are associated with a same TB of the plurality of TBs; and
transmitting the scrambled bits to the UE.

14. The method of claim 13, further comprising ordering the all of the bits of the one or more CBs in increasing order of a CB index associated with the bits.

15. The method of claim 14, wherein the scrambling comprises scrambling the ordered bits based on a scrambling identifier (ID) configured by the network entity.

16. The method of claim 13, further comprising:
modulating the scrambled bits to modulated symbols based on a modulation order configured by the network entity; and
mapping the modulated symbols to layers at the network entity at least in order of layer or in order of time.

17. The method of claim 11, wherein:
the plurality of TRPs comprises N TRPs;
the plurality of CBs comprises, for each of the one or more TBs, N sets of one or more CBs; and
at least one set of the N sets of one or more CBs, for each of the one or more TBs, is mapped to each of the N TRPs.

18. The method of claim 17, wherein:
the N TRPs is two TRPs comprising a first TRP and a second TRP;
the one or more TBs is one TB;
a first set of the N sets of one or more CBs is mapped to the first TRP via a first number of layers;
a second set of the N sets of one or more CBs is mapped to the second TRP via a second number of layers; and
a total number of the first and second number of layers is two, three, or four layers.

19. The method of claim 17, wherein:
the N TRPs is two TRPs comprising a first TRP and a second TRP TRPs;
the one or more TBs is two TBs comprising a first TB and a second TB;
a first set of the N sets of one or more CBs of the first TB is mapped to the first TRP via a first number of layers;
a second set of the N sets of one or more CBs of the second TB is mapped to the first TRP via a second number of layers;
a third set of the N sets of one or more CBs of the first TB is mapped to the second TRP via a third number of layers;
a fourth set of the N sets of one or more CBs of the second TB is mapped to the second TRP via a fourth number of layers;
a total number of the first, second, third, and fourth number of layers is five, six, seven, or eight layers;
a total number of the first and third set of CBs is equal to a total number of CBs within the first TB; and
a total number of the second and fourth set of CBs is equal to the total number of CBs within the second TB.

20. The method of claim 11, wherein:
the plurality of TRPs is two TRPs comprising a first TRP and a second TRP;
the one or more TBs is two TBs comprising a first TB and a second TB;
the CBs of the first TB are mapped to the first TRP via a first number of layers;
the CBs of the second TB are mapped to the second TRP via a second number of layers; and
a total number of the first and second number of layers is five, six, seven, or eight layers.

21. The method of claim 11, wherein:
at least one of: different bits of at least one CB of the plurality of CBs are mapped to layers of different TRPs or different CBs in at least one CB group (CBG) are mapped to layers of different TRPs; and
the at least one CB comprises a last CB of a TB or the at least one CBG comprises a last CBG of the TB.

22. An apparatus for wireless communications, the apparatus comprising:
means for receiving an indication of a number of layers at a plurality of transmission reception points (TRPs) and demodulation reference signal (DMRS) port information for the plurality of TRPs;
means for determining, based on the indicated number of layers and DMRS port information for the plurality of TRPs, a mapping of a plurality of code blocks (CBs) of one or more transport blocks (TBs) to the numbers of layers at the plurality of TRPs, wherein for one or more CBs of the plurality of CBs, all bits of the CB are mapped to a same TRP of the plurality of TRPs; and means for decoding the one or more TBs based on the determined mapping.

23. An apparatus for wireless communications, the apparatus comprising:

means for determining a number of layers at a plurality of transmission reception points (TRPs) and demodulation reference signal (DMRS) port information for the plurality of TRPs;

means for determining a mapping of a plurality of code blocks (CBs) of one or more transport blocks (TBs) to the numbers of layers at the plurality of TRPs, wherein for one or more CBs of the plurality of CBs, all bits of the CB are mapped to a same TRP of the plurality of TRPs; and means for allocating, based on the determined mapping, the plurality of CBs of the one or more to TBs to layers of plurality of TRPs, for transmission to a user equipment (UE) as part of a multiple-TRP transmission of the one or more TBs UE.

* * * * *